(12) United States Patent
Roth

(10) Patent No.: US 7,156,294 B2
(45) Date of Patent: Jan. 2, 2007

(54) SYSTEM FOR MARKETING LEISURE ACTIVITY SERVICES THROUGH PREPAID TICKETS

(75) Inventor: Anthony G. Roth, Newburyport, MA (US)

(73) Assignee: UTIX Group Incorporated, Burlington, MA (US)

( * ) Notice: Subject to any disclaimer, the term of this patent is extended or adjusted under 35 U.S.C. 154(b) by 0 days.

(21) Appl. No.: 11/204,803

(22) Filed: Aug. 15, 2005

(65) Prior Publication Data

US 2005/0274795 A1    Dec. 15, 2005

Related U.S. Application Data

(63) Continuation of application No. 10/827,737, filed on Apr. 20, 2004.

(51) Int. Cl.
*G06F 17/00* (2006.01)

(52) U.S. Cl. .................. 235/375; 235/383; 235/379; 235/381; 705/14; 705/39; 705/69

(58) Field of Classification Search ................. 235/375, 235/383, 379, 381; 705/14, 39, 69
See application file for complete search history.

(56) References Cited

U.S. PATENT DOCUMENTS

| | | | |
|---|---|---|---|
| 4,949,256 | A | 8/1990 | Humble |
| 5,903,633 | A | 5/1999 | Lorsch |
| 6,192,113 | B1 | 2/2001 | Lorsch |
| 6,422,462 | B1 | 7/2002 | Cohen |
| 6,594,640 | B1 | 7/2003 | Postrel |
| 2003/0050041 | A1 | 3/2003 | Wu |
| 2003/0053609 | A1 | 3/2003 | Risafi et al. |
| 2003/0194988 | A1 | 10/2003 | Knox |
| 2004/0011864 | A1 | 1/2004 | Thompson et al. |
| 2004/0039633 | A1 | 2/2004 | Nicholson |
| 2004/0068437 | A1 | 4/2004 | McGee et al. |
| 2004/0133511 | A1 | 7/2004 | Smith et al. |
| 2004/0158493 | A1 | 8/2004 | Nicholson |
| 2005/0033639 | A1 | 2/2005 | Myers |

*Primary Examiner*—Ahshik Kim
*Assistant Examiner*—Allyson N Trail
(74) *Attorney, Agent, or Firm*—Hamilton, Brook, Smith & Reynolds, P.C.

(57) ABSTRACT

One-time-use tickets containing a unique identification code that allow for prepayment of entertainment or personal services are distributed and sold. When a ticket is sold, it is activated by the seller notifying a ticket information manager of its sale, at which time the ticket's unique identification code is recorded by the ticket information manager. Part of the sale price is transferred by the vendor to an account maintained by a ticketing program manager. Ticketholders present the ticket for redemption of the particular service from an agreed service provider. The service provider verifies the ticket's validity by checking with the ticket information manager that the ticket's unique identification code is valid and that the ticket has been activated. While the purchase price of the ticket is fixed, service providers will receive their agreed payment price from the ticketing program manager's account when a ticket user redeems a ticket regardless of whether that price is higher or lower than the ticket purchase price.

36 Claims, 2 Drawing Sheets

Prepaid Services System 10

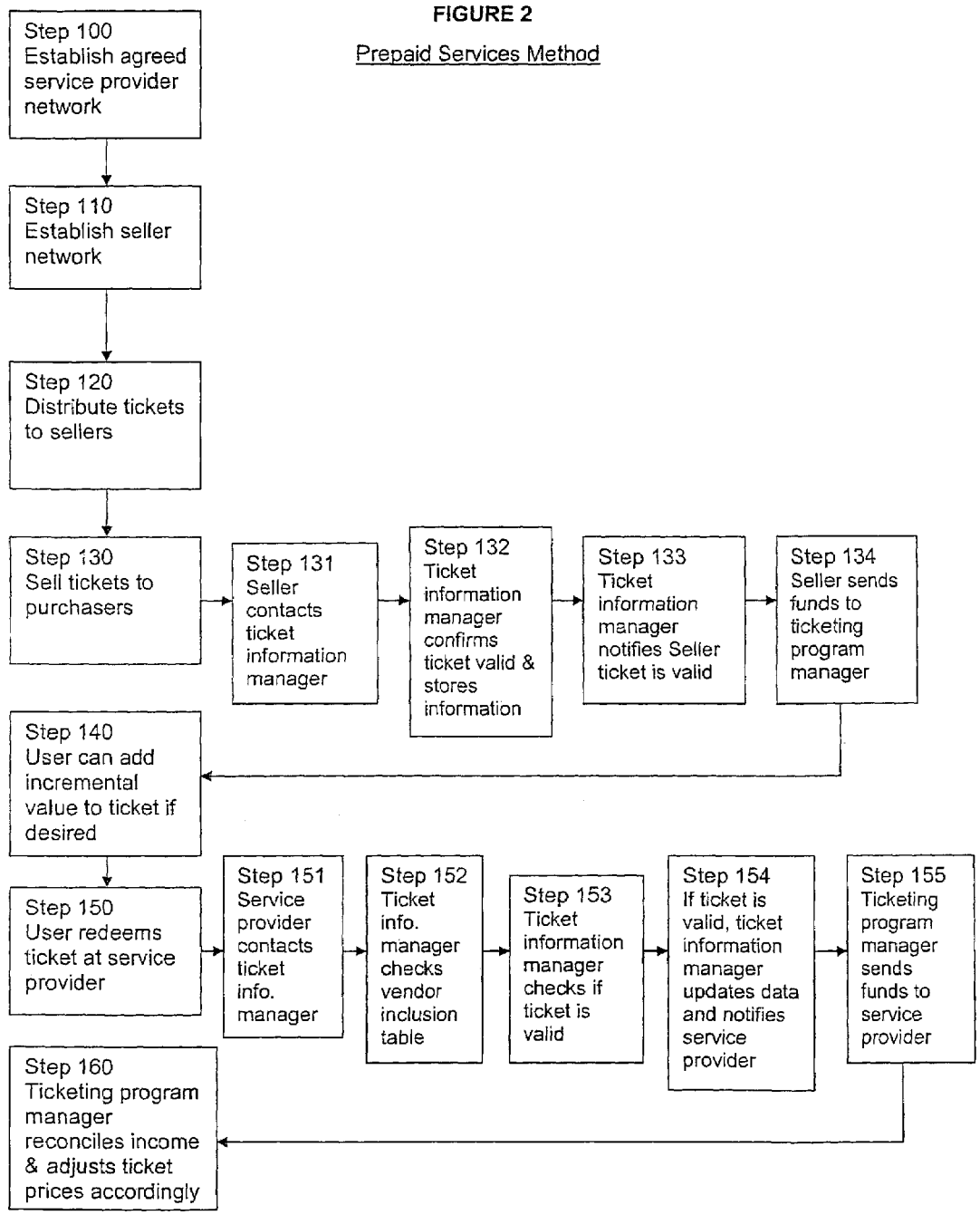

SYSTEM FOR MARKETING LEISURE ACTIVITY SERVICES THROUGH PREPAID TICKETS

RELATED APPLICATIONS

This application is a continuation of U.S. application Ser. No. 10/827,737, filed Apr. 20, 2004, the entire teachings of which are incorporated herein by reference.

FIELD OF THE INVENTION

The invention relates to marketing and distributing services, especially participatory sports or entertainment services, by collecting a prepayment and issuing to a customer a ticket or similar indicia that can be redeemed for a particular service. The service is one that can be obtained at the customer's option from any of a plurality of distinct service providers, including providers that normally charge more or less than others for the particular service involved. The invention further involves accounting for the usage and payment for services on this basis.

BACKGROUND OF THE INVENTION

Goods and services are typically obtained in exchange for payment and the payment might be rendered in various ways and in various amounts, such as by tender of cash currency, funds transfer between accounts, debit card purchase and exhaustion, credit arrangements involving future payment, barter or various other techniques. The particular goods or services that a customer might obtain from different providers differ. The reputations of providers differ. The manner of providing services, such as the time of day or as a function of demand or other aspects also differ. Importantly, the providers also demand different prices.

The differences between available offerings of goods and services generally boil down to differences in the costs and benefits of available goods and services that consumers have the option to choose. The costs and benefits of the possible choices are judged and compared by customers when making purchasing decisions. The customers seek the greatest benefit per unit cost and are free to make selections among a variety of different providers' offerings and terms, or even to substitute one type of service for another according to the customer's needs.

The relative merits and different options are perceived differently by different consumers, such that some consumers are willing to pay more or less than others for particular aspects of goods or services. The confluence of offerings (including what is offered and the terms of payment) with the selections made by consumers is the nature of the market of supply and demand by which resources are allocated among consumers in a market economy.

Not all consumer transactions are classic exercises of supply and demand wherein the customer has the utmost control and choice among differing alternatives with incrementally different costs and/or different pricing and payment arrangements. One example is a vendor's prepaid gift indicia, which can take various forms ranging from an authorized numbered slip bearing the vendor's name and a dollar amount to plastic cards bearing the vendor's logo and having a magnetically readable strip with a predetermined dollar value, each redeemable at the vendor's sales outlets. A prepaid gift indicia is generally issued by a particular retailer and can only be redeemed at that retailer's facilities. In this situation, the person who purchases the gift indicia may exercise a degree of choice, but the person who redeems it (typically the recipient of the gift) has no choice except to use the issuing retailer as the provider. Inasmuch as the issuer and the provider are the same entity, the issuer/provider has full control of the extent to which the selling price of the gift card corresponds to the offering price of the goods or services that are delivered. It is conceivable that the issuer/provider may include a premium or discount to encourage patronage and/or purchase of gift indicia, but within the control of the issuer/provider, the goods or services are provided in exchange for an amount that is related to the issuer/provider's pricing schedules.

It its known that providers of personal entertainment and sporting services, can issue a gift ticket that represents an incremental cash value or an incremental quantity of their services. This is possible because pricing and terms upon the sale of the gift ticket are controlled by the same party that controls the nature, quality and delivery terms of the services. As a result, the issuer/provider can issue a gift ticket for a given cash value or for a given increment of services. Thus a gift ticket or coupon might be granted for one pass to a matinee show or one Saturday afternoon bowling game, presumably with the ticket priced at an amount related to the pricing of the associated service. If the gift ticket is not defined as equal to a given service and/or if the issuer offers different services at different prices, then the gift ticket is denominated as a cash value and the user is entitled to deduct from the value on the ticket when paying for services, until the value associated with the ticket is exhausted.

It would be advantageous if a convenient arrangement could be organized whereby different potentially-competing suppliers of services can all honor a coupon or gift ticket or similar indicia of value that is denominated not in a monetary value but as as a particular service. It is not possible for the purchaser of a gift ticket for a given increment of services from one establishment to redeem the gift ticket at another establishment for comparable services, because the services are not likely to be of the same value to consumers, or offered at the same price by suppliers. If such a system were envisioned, it would necessarily involve exchanges of cash value and not transactions for a given increment of services regardless or where it is obtained.

A gift ticket system might be envisioned where one can buy a gift ticket for an incremental entertainment service (a single movie showing, for example), but if that gift ticket was to be redeemable at any of a plurality of competing different movie theaters, some provision would be needed to account for the fact that some theaters are more comfortable, have larger screens and better sound systems and consequently have higher ticket prices than others. Such an arrangement would not likely be practical, or at least would be less practical than using cash currency, and would require a network of behind-the-scenes fund transfers in varying amounts per transaction, between establishments at which the gift tickets are sold to customers and establishments at which the customer redeems the tickets for more or less expensive entertainment services. On the other hand, one could issue gift tickets for an incremental amount of money, leaving it to the consumer to decide where to expend the gift ticket, either wholly or in some successive number of transactions that each represent less than the full initial cost of the gift ticket.

Gift tickets can resemble debit cards and be presented by customers for deduction of an incremental monetary value in exchange for goods or services of that cost. It is known to have the representation of value carried on the card itself (e.g., in the case of a "smartcard" having security aspects).

Alternatively, it is known to have the card carry a serial number or address associated with a record stored in a database in communication with points of sale. These arrangements also require behind-thescenes transfer of funds among the entities selling the cards, perhaps the customer, and the entities at which the card is redeemed for goods or services.

It is known that credit cards can be issued that may be selectively limited to certain vendors, either by the users (to limit purchases by their children or others to whom the cards are lent) or by corporations (for example to employees' limit meal and entertainment expenses to certain establishments). See Cohen, U.S. Pat. No. 6,422,462 "Apparatus and Methods for Improved Credit Cards and Credit Card Transactions." Such cards are still redeemable, however, for the cash value of purchases made and the users are still responsible for paying for transactions on an as-used basis.

An arrangement that requires such a network of funds transfers is actually already in place. Credit card systems including Visa, MasterCard, Discover, American Express, etc., deal with goods/services providers across the board. They are available for the most part to any customer and to any supplier. However, existing credit card systems work because there is a medium of exchange, namely dollars and cents (or other currencies), that is the same as to all suppliers and all possible goods and services. There is no practical way in which to supply a given service, such as a round of golf or a theater ticket, that is free of association with a particular supplier and might be redeemed by the customer at any of a plurality of possible suppliers, even though their pricing may differ, without relying on a backup funds transfer network associated with the point of sale.

SUMMARY OF THE INVENTION

An inventive system and method arrange for prepayment by a customer of a predetermined sum for indicia such as a one-time-use gift ticket. The ticket is redeemable for a particular incremental quantity of services, as opposed to a cash value. The ticket is redeemable at any of a plurality of different providers that offer services that might be more or less similar but that qualify as the stated sort of services. The system and method are particularly applicable to personal services, entertainment services and similar quantifiable services, e.g., a movie pass (at any participating theater), a round of golf (at any participating golf course), a spa treatment (at any participating spa), etc.

The providers are independent entities that determine the nature of their own offerings and set their own prices. The gift ticket issuer enlists a number of suppliers of services to be obtained by redemption of the ticket for services, each having offerings that have character, terms and pricing arrangements that are approximately equal but may differ up to some threshold. Enlisted service providers agree to participate in the program and agree to accept the prepaid gift ticket as a payment method.

According to an inventive aspect, the enlisted service providers are not required to accept some standard or negotiated amount that is less than their regular price for services of the type that are delivered. Instead, the service providers accept for payment one time use tickets and process the sale to the customer over an existing credit card network or as some other financial transaction (including such instant payment systems as Pay Pal, which allows secured payment directly out of an existing bank account) in which the account that is debited is the account of the entity that issued the one-time-use ticket.

Gift tickets are sold through sales outlets, through the Internet, by telephone or in large blocks to institutional purchasers. Participating merchants whose services may be redeemed through the gift ticket system can also be empowered to sell the tickets. The tickets can be retail items of purchase that are activated at the point where the tickets are sold to customers.

The customers can use the gift tickets to redeem a stated increment of services for themselves or can present the ticket as a gift. The system is particularly applicable for use in giving gifts or employee awards or incentives, because the emphasis is wholly on redemption for the services and not on redemption of a given cash value.

Gift tickets each contain a unique identification code and are loaded with a predetermined value identified as a one-time use at any customer-chosen one of the service providers who have agreed to participate and who provide the pertinent goods or services that are identified when the ticket is sold.

When a ticket is sold, it is activated by the seller, for example by scanning a bar code associated with a uniform product code or by swiping a magnetic strip on the ticket itself, and notifying a ticket information manager of its sale. At that time, the unique identification code of the ticket is noted in a memory file by the ticket information manager. A predetermined portion of the sale price (i.e. less any service fee to the vendor) can be transferred by the vendor to the ticketing program manager at the time of ticket activation. Another alternative is that the entire purchase price is credited to an account maintained by or for the ticketing program manager who then regularly compensates the vendor for its participation, either on a flat-fee basis or as some function of the number of tickets sold, including perhaps added incentives at various sales level thresholds.

Gift tickets sold over the Internet or by telephone can be mailed in an activated state or can employ security features requiring the purchaser to activate the ticket (by Internet or telephone) upon receipt, for example, by repeating a code that was given to the purchaser at the time of the sale or by repeating a password determined by the purchaser at the time of sale.

The ticket can be purchased by the ultimate user or advantageously is given by the purchaser to the end user, for example as a gift, an employee or sales incentive award, a premium item or the like. The gift ticket holder presents the ticket for redemption of the particular service from one of a plurality of agreed service providers. The identities of the agreed service providers can be stored in an inclusion table that is employed by a ticket information manager. The service provider verifies the ticket's validity by checking with the ticket information manager that the ticket's unique identification code is valid and that the ticket has been activated, in a transaction that is much the same as a credit card authorization, which can use the same point of sale network communications as a credit card transaction.

According to another aspect, although the gift ticket is issued as a onetime-use item, purchasers can choose to add incremental value to upgrade the ticket at the time of purchase or prior to redemption. This feature has two main applications. With the capability of adding an incremental value, it is possible to apply the invention to services of a given kind (such as a round of golf, for example) that have more than some predetermined threshold difference in value that prevents them from being peers. Thus, the invention can be applied to an arrangement in which 18 holes at an international golf course such as Pebble Beach or the Masters' course in Augusta, for example, can be regarded as distinct services from less prestigious local golf courses that represent the norm. The customer can purchase an upgrade (or several incremental upgrades if more than one is needed for a particular provider) if desired, to the higher quality level in the same category of "a round of golf," which can be redeemed at any of the venues that fall into the higher classification.

Alternatively or in addition to providing upgrades for moving upwardly between two or more classes of a given service that might render two alternatives as peers, the holder of a ticket can be permitted to obtain an upgrade that arranges a ticket issued for one person for a given class of services to be redeemable for more than one person, within the same class of services.

Upgrades as described can be purchased in a manner similar to the initial transaction at which the ticket was originally offered and sold. Alternatively, sales of upgrades can be made in various other ways, such as through an Internet web site with the use of a credit card or by touch tone telephone through an Interactive Voice Response system connected to the ticket information manager's data storage system.

It is an aspect of the system and method that the purchase price of the gift ticket is fixed, but the ticket holder can redeem the ticket at any of a plurality of providers of a given service, even though the service providers may normally assess different prices. The service providers are credited in the redemption process with their agreed payment price from the ticketing program manager, so that the provider is paid in a normal manner when a ticket user redeems a ticket for a service. In this way, ticket holders are fully as welcome at the provider's establishment as a customer that might remit cash currency when obtaining the same service. In one embodiment of the system, the ticket is recognized by an existing credit card system such as American Express, Visa, Master Charge, Discover, etc. (particularly, Discover, which currently has the capability to distinguish among vendors in an inclusion list), and can be swiped in existing point of sale terminals, thus allowing for familiar use by the service provider and instant payment to the service provider's account. The service provider is credited for the price of its services in the usual manner of a credit card network, but unlike the usual credit card transaction, a charge is not levied against the user's account, but is debited against an account held by the ticketing program manager.

A system is also disclosed to implement the marketing, sale, redemption and account management of a one-time-use gift ticket for prepaid entertainment or personal services.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
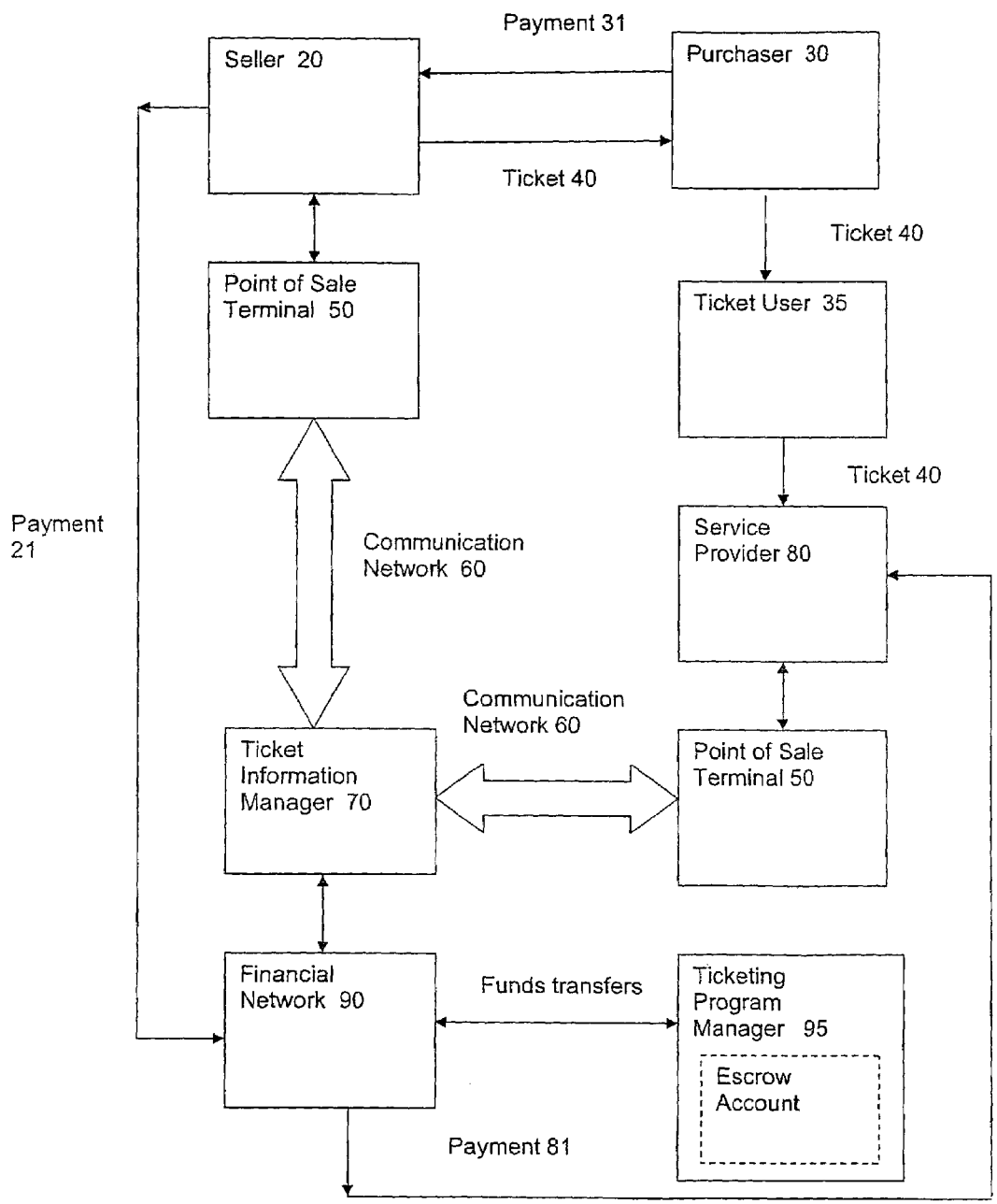
FIG. 1 is a stylized block diagram overview of a prepaid services system according to the invention; and, FIG. 2 is a flow diagram illustrating steps of an exemplary embodiment and method of administering a prepaid services system.

Referring to FIG. 1, a stylized overview of a prepaid services system, 10, is provided. As described herein, the prepaid services system 10 includes seven primary parties: seller 20, purchaser 30, ticket user 35, ticket information manager 70, service provider 80, financial network 90 and ticketing program manager 95.

Referring to the flow diagram of FIG. 2, at step 100, a ticketing program manager 95 desiring to implement the one-time-use gift ticket system of the invention, especially for a particular type of entertainment or personal service but also potentially for sale of goods, enlists a plurality of providers 80 of one or more substantially comparable services. The ticketing program manager 95 negotiates if necessary with the providers to honor the one-time-use ticket 40 according to the procedures described herein, namely to accept the ticket in exchange for provision of the provider's regular services and to seek remuneration for such services from the system maintained by or for the ticketing program manager.

It is advantageous for the ticketing program manager who enlists the service provider to bring the provider on as a member of a common group enterprise including, for example, advertising the enterprise and the provider's membership in the enterprise and the like. Likewise, membership in the enterprise can benefit individual providers, through additional advertising, access to new clientele and association with a product (the one-time-use ticket) that may be promoted as having a certain desirable cachet in and of itself. Additionally, it is desirable that the service providers accept the ticket at all times they are open, so that a "no-blackouts" feature of the gift ticket will enhance its acceptance in the marketplace and add to the desirability of receiving such a pass as a gift. However, it is not strictly necessary for the provider to undertake any particular responsibilities other than to provide the same services to gift ticket users as the provider provides to regular cash customers.

In this exemplary illustration of the invention, plural service providers 80 all provide at least one same stated service or article of goods, for example a round of golf, a day's worth of skiing or treatment at a health spa or the like. A broad network of providers of like services who accept the one-time-use ticket improves the marketability of the ticket, since the ability for the user to select among a variety of convenient providers is a desirable feature and one which differentiates the ticket in the present invention from ordinary gift cards or other indicia redeemable only at the retailers from whom it was purchased. It is also expected that the various providers will provide somewhat different services and may assess different charges, up to a threshold of difference within which the providers are considered to provide the "same" service as authorized and redeemable by presenting the one time use gift ticket.

Therefore, while the particular service for which a ticket is to be used is nominally the same service for that series of ticket (i.e., for tickets sold for redemption for a uniquely named or described service), the service providers need not all agree to provide identical services or to charge a dictated price for their services. Within the threshold of comparable pricing, differences in services can be accommodated owing to such factors as specific service component differences, location, prestige and quality, or other differences, as well as arbitrary consumer preferences. It is an inventive aspect of the subject system and method that service providers are not required to each accept identical payment value for their services, despite the fact that the gift ticket is sold for a given price and is redeemable for such services at any of the service providers.

The ticketing program manager sets the price charged by seller 20 for sale and activation of the ticket, so as to accommodate variations in actual service provider prices. One way to do this is to set the ticket price in view of the most expensive of all of the service providers, plus any service fee collected by the ticketing program manager. Another method, that advantageously allows a lower ticket price, and which can be expected to improve sales, is to set the ticket selling price near to the average charge incurred by all users of the service providers, plus costs of operating the system and a reasonable return to the ticketing program manager. Costs of operating the system can include items such as a fee to the ticket information manager for maintaining a processor to handle ticket information data storage and verification and validation of tickets and costs associated with the financial network, which might be a credit card network, in which case the credit card company might receive a portion of the sale price.

That is, the ticket selling price should be set and/or periodically adjusted so that the use of the tickets integrated over all the users and providers, has a sufficient surplus selling price over the average cost of the service (which may or may not be the same as the average provider price, given that users may frequent certain providers more than others), to provide at least a modest return on investment to the ticketing program manager. The ticket selling price is determined so that any overage that accumulates when a ticket is used to obtain the service from providers whose services are priced at less than the ticket selling price is balanced against the shortfall that arises when a ticket is used to obtain the service from providers whose services are priced higher than the ticket selling price. This calculation advantageously takes into account the extent to which users may prefer to patronize certain providers over others (e.g., providers that are perhaps more prestigious, that advertise more, that have been in business longer or that have locations that are convenient to a larger number of users). The calculation also provides for a return to the ticketing program manager over a break-even number.

After the service provider relationships have been established (step 100) or while that is occurring, the ticketing program manager 95 establishes relationships with existing sales outlets (step 110) who will sell the one-time-use tickets. The sellers 20 have point of sale terminals 50 connected to an existing network 60 that will allow fast, efficient communication with the ticket information manager 70. This communication is desirable for the transfer of the information required to initialize a ticket once it has been purchased. If the existing network is connected to a financial network 90, such as that maintained by a credit card company, this can also facilitate the automatic transfer of funds between the sellers 20 and the ticketing program manager 95 and between the ticketing program manager and service providers 80. For example, the credit card company can maintain an escrow account for the ticketing program manager, into which funds are transferred from the sellers and from which funds are withdrawn to pay service providers. By using an existing credit card network as the financial "rail" for the system, funds transfers can be managed with minimal dayto-day involvement from the ticketing program manager. While the use of an existing credit card network as the communication network carries certain advantages it is also possible for the required communications to take place over an Internet connection (for example to a secure web page hosted by the account manager) or a telephone connection to either "live" operators or an Interactive Voice Response system connected to the ticket information manager's (70) data storage equipment.

In one exemplary embodiment, the ticket information manager 70 has a communications link or other access to a financial network 90 which is a credit card provider's network. When a ticket is swiped on a point of sale terminal 50 at either the seller's end or the service provider's end, the credit card network will communicate with or otherwise access the ticket information manager's equipment. All ticket verification or validation and approval of service providers is handled directly by the ticket information manager. The ticket information manager simply returns an accept or reject message to the credit card network, which then either causes the transaction to be processed at the point of sale terminal or not.

In an alternative embodiment, the gift ticket issuer can be a commercial organization other than a seller, with communications equipment or the like to activate the ticket through communications with the ticketing program manager.

Once relationships with the sellers 20 and service providers 80 are established, the ticketing program manager distributes one-time-use tickets (step 120). Preferably the tickets are distributed at first in an un-initialized state, namely functional but not yet validated for use. A validation process includes placing suitable codes or notations on the tickets or storing codes in the tickets or elsewhere in a data storage medium that is accessible over a communication network. These codes can be checked when determining whether to permit use of the tickets.

In one embodiment, the tickets have a preprinted unique identification code and a magnetic strip or other means of recording information. The strip or other means can be prerecorded with a unique or at least substantially unique identification code for each ticket. The unique identification code may be an alphabetic code, a numeric code, an alpha numeric code, or other appropriate identification code capable of uniquely identifying an individual ticket, and perhaps also identifying the related type of service (e.g., golf, spa, etc.). In an alternate embodiment, the tickets do not have a preprinted or prerecorded identification code, but do contain a recordable medium such as a magnetic strip or an electronic storage device, which may be loaded with a unique code preliminarily or may have an area in which such a code is inserted as a part of the initialization procedure.

According to an advantageous aspect, the issued ticket is configured and formatted with certain indicia characteristic of a standard credit card. This can include, without limitation, printed or embossed account identification numbers, a magnetic strip or on board integrated circuit memory, a one or two dimensional optical bar code, etc. The information can be prerecorded or at least partly recordable. Two or more redundant means for storing the same information, such as an account number or the like, can be provided for data entry in different optional ways, of the different storage techniques can be used for information that is otherwise cross referenced. Advantageously, the ticket has sufficient information carried thereon to permit use of the ticket substantially in the same physical manner as a standard credit card, namely using equipment conventionally provided at a point-of-sale terminal 50 (scanners, magnetic strip swipe readers, keyboards, etc.).

In one embodiment, the ticketing program manager has reserved for itself a series of digits or numbers or number combinations in a standard credit card format that are unique to the account manager and identify one or more accounts associated with the ticketing program manager. Initialization and validation steps, which are processed by a ticket information manager 70 can be undertaken over an existing communication network 60, which advantageously is a network that processes conventional credit cards, or can be another public or private data communication network. Other types of communication devices may be used instead of or in addition to a standard point-of-sale terminal programmed to handle credit cards, so long as the device is capable of communicating sufficient ticket information over an operable communications network to effect the steps as described herein. For example, in another form of the invention, the ticket information can be transmitted between the seller and the ticket information manager by telephone either by voice in association with a live operator or through a telephone keypad to an Interactive Voice Response system.

The one-time-use ticket proceeds through several steps associated with initial issue, sale (preferably with validation concurrently upon sale), and later presentation as an identification of value used to present remittance for a service. At step 130, the purchaser 30 selects a gift ticket for purchase and pays the seller 20 some agreed purchase price 31. This transaction can be a conventional retail, wholesale or other transaction in which one or more tickets are exchanged for cash or credit or other remuneration.

At step 131, the seller 20 activates the ticket, preferably including transmitting an identification code that is or becomes associated with the ticket (e.g., is at least partly read from or written onto the ticket). The identification code is at least substantially unique to the ticket and is transmitted over the existing communications network 60 to the ticket information manager 70 or to a data store associated with the ticket information manager 70. If the system is such that the ticket already has a preprinted or recorded identification number, the ticket information manager compares this number with the numbers of tickets that it has previously distributed to sellers as one step in determining validity. If the ticket has a valid number that has not already been processed, the ticket information manager records the ticket's number, noting for example in a data memory that the ticket has now been purchased and should be authorized for use. Other information is also preferably recorded, including at least the purchase price and the date of the sale transaction (step 132). The ticket information manager preferably acknowledges by communication back to the seller that the ticket is valid and now has been initialized (step 133), although the acknowledgement can be deferred or accomplished off line.

The seller 20 then accepts payment 31 from the purchaser 30 (who might or might not be the ultimate ticket user). At some point, the seller 20 transfers payment 21 to the ticketing program manager 95, preferably through a financial network 90 such as a credit card network. If a credit card network is used, funds can be automatically transferred to an escrow account maintained with the credit card company for the ticketing program manager 95. Although the seller could have previously paid the ticketing program manager 95 in full for the tickets and then resells them to customers, it is preferable that payment to the ticketing program manager's escrow account is made from funds received from the customer 30. Therefore, payment 31, 21 is transferred to or for the benefit of the ticketing program manager when payment is tendered by the customer 30. The payment 21 to the ticketing program manager (or it's escrow account) is the payment tendered, less a portion of the sale price that is due to the seller (step 134) in consideration of making the sale.

In an embodiment wherein the communication network 60 is an existing credit card network, credit can be transferred immediately to the ticketing program manager's account. In another embodiment, the initialization process can take place over the Internet, e.g., via a secure web page hosted by the ticketing program manager or another party providing account transfer services. For example, payment to the ticketing program manager's escrow account can be effected through available Internet payment mechanisms such as Pay Pal, which provides for value transfer to user's accounts. Otherwise, the seller 20 can remit funds owed to the ticketing program manager 95 on an invoiced or other basis. Because the initialization of the ticket (steps 131–133) must be done through the ticket information manager 70, an exact, up-to-date record is maintained of how many tickets each seller has sold, and at what price. This facilitates accountability and correct payment to the ticketing program manager or into its escrow account.

Once a customer has purchased a ticket, the ticket may be used by the purchaser 30 or by someone to whom the purchaser has conveyed the ticket, for example as a premium or as a gift for redemption, etc. The ticket is used as a representation of value used as remittance at any of the agreed service providers 80. (Inasmuch as the user 35 might or might not be the same party as the purchaser 30, for the purpose of this description, the term "user" should be construed to encompass an initial purchaser or anyone to whom the purchaser has conveyed the ticket.)

A ticket user 35 presents the ticket to a service provider at step 150 in order to redeem the indicated service. At step 151, the service provider preferably verifies the validity of the ticket by data transfer with the ticket information manager 70 over the communications network 60. If the communications network is one that is maintained by a credit card provider, the credit card provider's equipment would recognize the unique identification code as being not an ordinary credit card but a onetime-use ticket and would contact the ticket information manager to perform verification of both the service provider's inclusion in the program and the validity of the individual ticket. As a first check, the ticket information manager will verify that the service provider is among those who have agreed to accept the tickets. (Step 152). This may be accomplished by the storage of an inclusion table by the ticket information manager. If the communications network is also a credit card network, the initial screening for whether a service provider is listed in an inclusion table can also be made by the credit card service provider. The unique identification code associated with the ticket is then transmitted to the ticket information manager. At step 153, the ticket code is compared with a list of codes stored in a data base maintained by (or for) the ticket information manager, namely a list of valid ticket codes for initialized but as-yet-unused tickets. If the ticket code is valid and the ticket has not yet been used, the ticket information manager returns a message to the service provider (via the credit card network if employed as part of the system) that the ticket is valid, indicating that the user may redeem a single use of the service provider's services, such as the aforementioned round of golf, day of skiing or treatment at a health spa or the like. The ticket information manager then records data referenced to the ticket code to represent that the ticket has been used, so that the ticket may not be used validly again (step 154).

By communicating to the service provider 80 that the ticket is valid, the ticket information manager 70 basically indicates that the ticketing program manager 95 will remit payment 81 to the service provider 80 the purchase price of the service for which the ticket user 35 has presented the ticket. If a credit card provider is serving as the financial network and the communications network, the ticket information manager can signal the credit card provider to release funds from an escrow account maintained for the ticketing program manager directly to the service provider's account. To facilitate validation, it is possible for a service provider that offers various services to report to the ticket information manager that a particular service is being redeemed, whereby the ticketing program manager can account for the amount to be remitted. Finally, the ticket information manager sends a notification to the financial network that a ticket has been redeemed, at which point the financial network provider transfers payment 81 from the ticketing program manager's account to the service provider's account. (Step 155).

In the embodiment wherein the communications network 60 is (or links with) an existing credit card network, credit for the funds may be transferred from the ticketing program manager (or its escrow account maintained by the credit card network) to the service provider's account immediately in the same way as a credit card transaction, but customer is not privy to the accounting details of price and the like, and preferably is not required to present identification or sign receipts or the like, because the monetary transaction is between the ticketing program manager and the service provider.

Although a credit card network can be used, the communications network can be another public or private data communications network, such as an Internet connection to a web page hosted by (or for) the ticket information manager or alternatively by the ticketing program manager. The ticketing program manager can transfer funds to the service provider using a variety of Internet-based services, such as Pay Pal, Bill Point, etc. Otherwise, the ticketing program manager can make payment by check or other means to service providers on a periodic basis to account for the number of users that have used that service provider's services since last payment. It will be recognized that the separate functional blocks depicted in FIG. 1 as ticket information manager 70 and ticketing program manager 95 may be performed by the same entity. It should be recognized that an escrow account cam be maintained either by the ticketing program manager as depicted in FIG. 1 or by the financial network 90 on behalf of the ticketing program manager.

If, at step 153, the ticket information manager determines that the ticket does not have a valid identification code, or has a code for a ticket that has already been used once, then a message is returned to the service provider indicating that the ticket is not valid and that the service provider should not accept the ticket as payment for services. A similar message would result if, at step 152, the ticket information manager does not recognize the service provider as one who has agreed to participate in the prepaid leisure activity services system. That is, the service provider is not listed in the ticket information manager's inclusion table.

It is an aspect of the invention that the gift ticket carries information and functions as a means for the user to obtain and remit for an incremental service, as opposed to an incremental sum of money. The various service providers may actually charge different amounts for services. A given service provider may assess different charges at different times. Likewise the retailer that originally sold the ticket to the customer may have more or less of a markup. From the user's standpoint, the system treats the ticket as the means to provide an increment of services (or possibly goods) apart from these pricing considerations, which is advantageous. At step 160, after the system has been in operation for some period of time, the ticketing program manager can compare and reconcile any overage/underage on proceeds received on tickets presented for higher or lower priced service providers and/or sold by sellers with higher or lower markups, and adjust pricing and payment strategies or provider membership arrangements, if necessary. These differences are absorbed and averaged by the ticketing program manager, who can make certain decisions about how the system is run and priced. For example, the ticketing program manager may decide based on experience to adjust the sale price of future tickets or may determine that certain sellers and/or providers will or will not become or remain active, competition and supply and demand causing the market to reach an equilibrium. However, because the gift ticket represents credit for a service and not a monetary value to the users, a change in price for new ticket purchases will not affect the redeem-ability of tickets already purchased.

In another embodiment of the invention, the purchasers or ticket users are provided a capability to add a limited amount of incremental value to the ticket (an upgrade), either at time of purchase or at any time after purchase and prior to redemption of the ticket for services (step 140). The addition of incremental value can be employed at least two ways. The feature incorporating the addition of incremental value can apply to allow use of the ticket at service providers whose services are priced significantly higher than the initial value of the ticket, e.g., services that are substantially different and that might be expected to be priced very differently from other services of the same category. If a user wants to redeem the ticket at one of these service providers, incremental value must first be added to the ticket. Incremental value need not necessarily be an integer multiple of the ticket's initial value, but can be a fraction of the initial value. However, it is a particular feature of the invention that the ticket always reflects incremental values, or credits, to the user, and not monetary value. While the ticket information manager may store for each ticket data representing the actual monetary value that has been purchased by the ticket user, any features that allow the user to retrieve information about the ticket (such as Interactive Voice Response or Internet access described more fully below) will always return incremental credit information and not monetary value to the user. This distinction reinforces the premise that the ticket represents the ability to redeem a service from agreed providers regardless of the cost of that service.

In another method, additional incremental value is used to allow the user to redeem the ticket to accommodate providing the service to additional people at the time of redemption, for example, so that the user and a guest or guests can pay for all of their rounds of golf on the ticket. According to a preferred arrangement, a ticket with additional incremental value, like an initial ticket, cannot be presented on more than one occasion. Instead, the ticket is marketed and used as a one-time-use ticket for a given service, and adding increments refers to adding (or perhaps changing) the service that is provided when the single use is redeemed by one or more associated users. It will be recognized that the incremental upgrades for higher-priced service providers and for allowing additional guests can also be combined to allow either or both options as part of the method.

The feature incorporating the addition of incremental value can apply to allow use of the ticket at service providers whose services are priced significantly higher than the initial value of the ticket, e.g., services that are substantially different and that might be expected to be priced very differently from other services of the same category. If a user wants to redeem the ticket at one of these service providers, incremental value must first be added to the ticket. Incremental value need not necessarily be an integer multiple of the ticket's initial value, but can be a fraction of the initial value. However, it is a particular feature of the invention that the ticket always reflects incremental values, or credits, to the user, and not monetary value. While the ticket information manager may store for each ticket data representing the actual monetary value that has been purchased by the ticket user, any features that allow the user to retrieve information about the ticket (such as Interactive Voice Response or Internet access described more fully below) will always return incremental credit information and not monetary value to the user. This distinction reinforces the premise that the ticket represents the ability to redeem a service from agreed providers regardless of the cost of that service.

In another embodiment of the invention, a user can purchase additional incremental value directly from the ticketing program manager, or an agent of the ticketing program manager. This can be implemented in various ways, including via telephone or the Internet.

A telephone-based method for allowing purchase of additional incremental value can be implemented either with "live" operators who respond to users' telephone calls or with Interactive Voice Response (IVR) equipment. In a live operator system, the operators will have access to the ticket information manager's database of ticket (and, if applicable, user) information and can search, access and modify the information via a computer terminal or like device. Another option provides for the ticket information manager (or, alternatively the ticketing program manager) to maintain an (IVR) system that is entirely computerized. Users who call to add additional value to their tickets will do so by entering numbers on the telephone keypad, in response to computergenerated messages, such as "Please enter 1 to add value to your ticket. Now enter your 16 digit ticket number followed by the pound sign." Ticket information can be read back to the user with voice simulation or prerecorded messages stored as a part of the IVR system. It is also possible to combine live and IVR systems so that users have the option of performing the transaction with a person or a computer.

A further embodiment of the system provides for Internet-based account management. The ticket information manager (or, alternatively the ticketing program manager) can maintain computers connected to the Internet and programmed to allow users to access and update ticket information or upgrade ticket value via a web page. The web address can be preprinted on the tickets or on the packaging with which the tickets are sold. Upon entering the ticket information manager's secure web site, users will be asked to enter the unique identification code of their ticket. The ticket information manager's computer will check the ticket number against the database of valid ticket numbers and if the number is valid, allow the user to add value to the ticket, and pay for the transaction through a standard credit card. The ticket information manager's database will then be updated to reflect the additional value added to the user's ticket and credit will be added to the ticketing program manager's account. In an Internet based option, the user can also use the Internet to simply verify ticket value or expiration date and once connected to the ticket information manager's web page also search for service providers in the user's locality, or in a travel destination where the user expects to redeem the ticket. This feature gives added value to service providers since the web access gives the service providers an opportunity to provide web page links with customized advertising or other information in addition to standard information provided by the ticketing program manager's web site.

In any embodiment of the invention that allows user retrieval of ticket information, the actual cash value that has been purchased in connection with the ticket is never available to the user, only the number of incremental credits loaded onto the ticket.

Those skilled in the art will recognize that the ticket information manager's database can be set up to store information beyond the ticket number and value associated with a ticket. For example, user identification information such as name, address and e-mail address can be stored at the time a user purchases a ticket. Storage of this information would, for example, allow the ticketing program manager to replace a lost ticket upon presentation by the user of such personal identification information. The ticket information manager can search its database for a user's name and determine whether the user's ticket has been redeemed. If the ticket has not yet been redeemed, then the lost ticket number can be canceled and a new ticket issued to the user. This transaction could be implemented either in person through a seller or with the ticketing program manager (or, alternatively, the ticket information manager) via telephone or the Internet as described above. Recordation of user information can also provide a valuable feature to service providers who, if given access to such information (either for a fee or by other agreement with the ticketing program manager) can access that information for marketing purposes, and can target marketing specifically to users who have redeemed their tickets at that particular service provider.

In the case where a ticket can have additional incremental value added, part of step 153 would include not only verifying that the ticket is valid, but determining the total value of the ticket. Again, the ticket's value as seen by a user is not intended to be in monetary units, but incremental credits. For example, a ticket may be initialized with one credit at time of sale (a base value), and be valid for a single use at all service providers who accept the base value. Additional credits can be fractions of the base value. For example, additional increments might be one quarter of the initial value. A user can then purchase four additional increments to take a guest if that is a feature of the system, or might purchase only the number of incremental credits to be able to use the ticket at a service provider who does not accept the base value of the ticket. In this embodiment of the invention, the service provider will verify the ticket's validity and its value at time of redemption. Because the ticket is a one-time-use ticket, any additional value on the ticket that exceeds that needed for the user to redeem the service will be lost to the user.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for provision of prepaid services, comprising the steps of:
   (a) providing service specific tickets, each ticket being valid for incremental quantity of services at any one of a plurality of service providers, incremental quantity being measured in terms of number of times of use of the ticket; and (b) enabling a variable rate redemption of the ticket for service provided by one of the plurality of service providers, by:

allowing a ticket-holder to select one of the service providers among the plurality of service providers for redemption in exchange for a unit use of a desired service from said selected service provider;

upon presentation of the ticket by the ticket-holder to the selected service provider, debiting a price set by the selected service provider for the desired service, wherein price debited for said service by at least certain of said service providers being different from price debited by others of said service providers for the same said service, such that the ticket is redeemed at a variable rate among the plurality of service providers for said same service;

effecting payment at the price debited for said service by said selected service provider; and absorbing any differences in prices debited by the plurality of service providers for the same service, and optionally adjusting price of the ticket redeemable for the service.

2. The method of claim 1, wherein the ticket is redeemable for a certain service from the selected service provider, as opposed to a cash value.

3. The method of claim 1, wherein the ticket is a one-time-use ticket.

4. The method of claim 3, further comprising permitting optional purchase of additional incremental value above a base ticket value on the ticket; and presenting the ticket by a ticket-holder to one of a plurality of service providers in exchange for use of the provider's service where the price debited by said service provider can be higher than the base ticket value.

5. The method of claim 4, wherein said additional incremental value is an upgrade of a service.

6. The method of claim 4, wherein said additional incremental value is also useable to redeem services from the service provider for more than one person when the ticket is presented for use on a given occasion.

7. The method of claim 4, wherein said one-time-use ticket has a maximum value that may be added to the ticket and further comprising the additional step of verifying that any additional value to be added does not exceed the maximum value.

8. The method of claim 1, wherein the ticket is valid for redemption for a limited period of time after activation and further comprising the additional step of the service provider's verifying an expiration date of the ticket.

9. The method of claim 1, wherein customer information is recorded at the time of purchase and further comprising at least one of said customer and ticket-holder obtaining a replacement ticket upon presentation of customer identification after the original said ticket is lost or stolen and has not already been accepted by a service provider.

10. The method of claim 1, further comprising communicating between the ticket holder and a processor over a public communications network for checking a ticket status, said processor having access to stored ticket data, wherein said communicating excludes reporting of any monetary value associated with the ticket but includes reporting incremental credit information.

11. The method of claim 1, further comprising the computer implemented step of:

(c) maintaining a listing indicating the plurality of service providers and respective services.

12. A method as claimed in claim 1 further comprising accounting by a card issuer being on the immediate value of each ticket upon first purchase of the ticket instead of on price debited upon ticket redemption.

13. A method as claimed in claim 12 wherein the first purchase is by a customer of the card issuer, the customer reselling or gifting the ticket to the ticket holder.

14. A method as claimed in claim 12 further enabling reporting per ticket, any combination of (i) a difference between immediate value accounted by the card issuer and price debited by service provider, (ii) date of redemption, and (iii) location of service provider at redemption.

15. A prepaid services account management system, comprising:

(a) means for providing service specific tickets usable in a merchant payment network, each ticket, being valid for incremental quantity of services at any one of a plurality of service providers different tickets being redeemable for different services, incremental quantity being measured in terms of number of times of use of the ticket;

(b) inclusion listing means for identifying among all service providers that are authorized participants in the merchant payment network, a subset of participants that are authorized service providers for at least one service, wherein for tickets redeemable for a same service, each ticket is redeemed at a variable rate among the authorized service providers for said same service; and (c) processor means for:

(i) crediting the service provider at a variable rate for redemption of the ticket for a respective service, wherein price debited for said service by at least certain of the service providers is different from price debited by others of said service providers for the same service, such that the ticket is redeemed at a variable rate among the plurality of service providers for said same service, wherein the service provider is selected by a ticket-holder among said subset of participants of the inclusion list; and, (ii) absorbing any differences in prices debited by the plurality of service providers for the same service, and optionally adjusting price of the ticket redeemable for the service.

16. The system of claim 15, wherein the ticket is redeemable for a certain service from the selected service provider, as opposed to a cash value.

17. The system of claim 15, further comprising:

(d) means for determining whether the ticket presented to the service provider has exceeded an expiration date.

18. The system of claim 15, further comprising:

(d) means for the ticket-holder to purchase additional incremental value on said ticket; and (e) means for a service provider to verify the amount of additional incremental value added to the ticket.

19. The system of claim 15, wherein said processor means includes means for transmission and reception of communications over a communications network.

20. The system of claim 15, wherein the ticket contains indicia of a credit card comprising at least one of a printed numerical code, an embossed 16 digit unique numerical code, and code represented by at least one of optical, magnetic and electronic encoding, which code is readable using standard point of sale equipment.

21. The system of claim 20, wherein the merchant payment network is a standard credit card network.

22. The system of claim 15, wherein the ticket contains a recordable medium and wherein the recordable medium has a blank area when received by a seller, and validation information and purchase data are recorded on said recordable medium in conjunction with purchase from the seller.

23. The system of claim 15, further comprising a processor coupled to the providing means, wherein the processor is programmed to report to the ticket-holder credit value information associated with the ticket, while refraining from reporting an associated monetary value thereof.

24. A method for provision of prepaid services, comprising the steps of:
(a) having a card issuer provide service specific tickets, each ticket having an immediately accountable value to the card issuer, each said ticket being valid for incremental quantity of services at any one of a plurality of service providers, incremental quantity being measured in terms of number of times of use of the ticket;
(b) enabling a variable rate redemption of the ticket for service provided by one of the plurality of service providers, by:
  allowing a ticket-holder to select one of the service providers among the plurality of service providers for redemption in exchange for a unit use of a desired service from said selected service provider;
  upon presentation of the ticket by the ticket-holder to the selected service provider, debiting a price set by the selected service provider for the desired service, wherein price debited for said service by at least certain of said service providers being different from price debited by others of said service providers for the same said service, such that the ticket is redeemed at a variable rate among the plurality of service providers for said same service; and
  effecting payment at the price debited for said service by said selected service provider; and
(c) absorbing any differences in prices debited by the plurality of service providers for the same service, and optionally adjusting price of the ticket redeemable for the service.

25. The method of claim 24, wherein the ticket is redeemable for a certain service from the selected service provider, as opposed to a cash value.

26. The method of claim 24, wherein the ticket is a one-time-use ticket.

27. The method of claim 24, further comprising permitting optional purchase of additional incremental value above a base ticket value on the ticket; and presenting the ticket by a ticket-holder to one of a plurality of service providers in exchange for use of the provider's service where the price debited by said service provider can be higher than the base ticket value.

28. The method of claim 27, wherein said additional incremental value is an upgrade of a service.

29. The method of claim 27, wherein said additional incremental value is also useable to redeem services from the service provider for more than one person when the ticket is presented for use on a given occasion.

30. The method of claim 24, further comprising the computer implemented step of:
(d) maintaining a listing indicating the plurality of service providers and respective services.

31. A prepaid services account management system, comprising:
(a) means for enabling a card issuer to provide service specific tickets, each ticket having an immediately accountable value to the card issuer, different tickets being redeemable for different services;
(b) inclusion listing means for identifying among plural service providers that are authorized participants, a subset of participants that are authorized service providers for at least one service, wherein for tickets redeemable for a same service, each ticket is redeemed at a variable rate among the authorized service providers for said same service; and
(c) processor means for:
  (i) crediting the service provider at a variable rate for redemption of the ticket for a respective service, wherein price debited for said service by at least certain of the service providers is different from price debited by others of said service providers for the same service, such that the ticket is redeemed at a variable rate among the plurality of service providers for said same service,
  wherein the service provider is selected by a ticket-holder among said subset of participants of the inclusion list; and
  (ii) absorbing any differences in prices debited by the plurality of service providers for the same service,
  wherein the immediately accountable value to the card issuer is at first purchase of the ticket instead of on price debited upon ticket redemption.

32. The system of claim 31, wherein the ticket is redeemable for a certain service from the selected service provider, as opposed to a cash value.

33. The system of claim 31, further comprising:
(d) means for the ticket-holder to purchase additional incremental quantity on said ticket, incremental quantity being measured in terms of number of times of use of the ticket; and
(e) means for a service provider to verify the amount of additional incremental quantity added to the ticket.

34. The system of claim 31, wherein the service specific tickets are usable in a merchant payment network and the merchant payment network is a credit card network.

35. The system of claim 31 wherein first purchase is by a customer of the card issuer, and the customer reselling or gifting the ticket to the ticket holder.

36. The system of claim 31 further comprising reporting means for enabling reporting per ticket, any combination of (i) a difference between immediate value accounted by the card issuer and price debited by service provider, (ii) date of redemption, and (iii) location of service provider at redemption.

* * * * *